United States Patent
Kim et al.

(10) Patent No.: US 9,215,426 B2
(45) Date of Patent: Dec. 15, 2015

(54) IMAGING APPARATUS AND IMAGING METHOD

(71) Applicant: SAMSUNG Electronics Co., Ltd., Suwon-si, Gyeonggi-do (KR)

(72) Inventors: Do-han Kim, Suwon-si (KR); Chang-woo Lee, Suwon-si (KR); Young-hoon Jeong, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 233 days.

(21) Appl. No.: 13/760,103

(22) Filed: Feb. 6, 2013

(65) Prior Publication Data

US 2014/0015966 A1    Jan. 16, 2014

(30) Foreign Application Priority Data

Jul. 10, 2012    (KR) .......................... 10-2012-0075155

(51) Int. Cl.
  *H04N 7/18* (2006.01)
  *H04N 5/232* (2006.01)

(52) U.S. Cl.
  CPC .............. *H04N 7/18* (2013.01); *H04N 5/23222* (2013.01); *H04N 5/23293* (2013.01)

(58) Field of Classification Search
  CPC .......... H04N 5/23264; H04N 5/23267; H04N 5/2327
  USPC ......................................................... 348/208.4
  See application file for complete search history.

(56) References Cited

U.S. PATENT DOCUMENTS

| | | | |
|---|---|---|---|
| 4,332,452 A * | 6/1982 | Nakano et al. ................. 396/465 |
| 8,654,236 B2 * | 2/2014 | Shiozaki ................. 348/333.02 |
| 2004/0169760 A1 * | 9/2004 | Furukawa ................. 348/333.12 |
| 2007/0025722 A1 * | 2/2007 | Matsugu et al. ................. 396/263 |
| 2009/0295940 A1 * | 12/2009 | Shibuno ..................... 348/226.1 |
| 2012/0194702 A1 * | 8/2012 | Naka ......................... 348/231.99 |
| 2012/0314100 A1 * | 12/2012 | Frank ......................... 348/229.1 |

* cited by examiner

*Primary Examiner* — Joseph E Avellino
*Assistant Examiner* — Jasmine Nguyen
(74) *Attorney, Agent, or Firm* — Staas & Halsey LLP (57) ABSTRACT

An imaging apparatus and an imaging method includes an imaging unit to collect light input through a lens and sensing an image, a storage unit to store an acquisition condition and the sensed image, a control unit to designate a plurality of objects in the stored image, to analyze respective motion of the plurality of objects, and to predict a moment of acquisition at which the motion corresponds to the acquisition condition, and a shutter control unit to control the imaging unit to perform imaging at the predicted moment of acquisition.

18 Claims, 12 Drawing Sheets

IMAGING APPARATUS AND IMAGING METHOD

CROSS-REFERENCE TO RELATED APPLICATIONS

This application claims priority under 35 U.S.C. §119(a) to Korean Patent Application No. 10-2012-0075155, filed on Jul. 10, 2012, in the Korean Intellectual Property Office, the disclosure of which is incorporated herein by reference in its entirety.

BACKGROUND OF THE INVENTION

1. Field of the Invention

The present disclosure relates to an imaging apparatus and an imaging method, and more particularly to, an imaging apparatus and an imaging method, which can capture an instantaneous image using motion information of an object.

2. Description of the Related Art

An imaging apparatus adopts a method for acquiring and processing an image based on a regular signal that is generated in the apparatus. Recently, a camera, a camcorder, a mobile phone, or the like, receives, processes, and stores an image of several frames per second from a sensor during capturing of a still image, and in the case of a moving image, records or displays, for a user, the image that is acquired generally at a rate of 30 frames or 60 frames per second, which may differ depending on the resolution of the apparatus.

All images that are generated in the natural world have an analogous character of temporal continuity, and an imaging apparatus converts a continuous image at a corresponding time point into a discrete signal on the basis of a reference signal that is generated in the imaging apparatus, and processes and stores the converted image signal. Accordingly, in acquiring and processing an image based on a regular signal generated in the apparatus, it is difficult for a user to capture an accurate time point. For example, it is quite difficult for a user to image a sporting scene at a desired time point or to appropriately image an object that moves at high speed.

In order to solve this problem, various methods have been proposed. For example, according to one of such methods, a device (position sensor) for sensing an object is mounted on a camera, and if the object approaches a predetermined range, a synchronous signal is generated and transmitted to a signal generator, and a new signal is generated in a transmission system. However, since the device for sensing the object acquires only position information of a moving object, it is difficult for the above-described camera to image the situation desired by a user and to find an accurate imaging time point. Accordingly, there is a need for a technique that enables a user to acquire a desired time point and to perform imaging more effectively.

SUMMARY OF THE INVENTION

The present disclosure provides an imaging apparatus and an imaging method, which can capture an instantaneous time point and perform imaging. The present general inventive concept provides an apparatus and method of acquiring a desired time point to perform imaging more effectively.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an imaging apparatus including an imaging unit to collect light input through a lens and sensing an image, a storage unit to store an acquisition condition and the sensed image, a control unit to designate a plurality of objects in the stored image, to analyze respective motion of the plurality of objects, and to predict a moment of acquisition at which the motion corresponds to the acquisition condition, and a shutter control unit to control the imaging unit to perform imaging at the predicted moment of acquisition.

The imaging apparatus may further include a display unit to display the image stored in the storage unit, and an input unit to receive an input of a user selection signal to select the objects included in the displayed image. The control unit may designate the plurality of objects based on the user selection signal.

The control unit may automatically designate the object that corresponds to predetermined selection criteria among the objects that are included in the image stored in the storage unit. Further, the control unit may predict the moment of acquisition by calculating at least one of moving traces and moving speeds of the respective objects.

The acquisition condition may be a condition set to perform the acquisition at a time point where collision occurs between the plurality of objects, and the control unit may calculate moving traces and moving speeds of the plurality of objects and may determine a time point where it is predicted that collision occurs between the plurality of objects as the moment of acquisition.

The imaging unit may periodically sense the image, the storage unit may store the sensed image, and the control unit may determine existence/nonexistence of a new object by analyzing the images stored in the storage unit, and if the new object exists, predict the moment of acquisition based on motion of the new object and the motion of the existing object.

The control unit may predict the moment of acquisition by calculating at least one of motion traces and motion speeds of the existing object and the new object.

The foregoing and/or other features and utilities of the present general inventive concept may be achieved by providing an imaging method including collecting light input through a lens and sensing an image, storing the sensed image, designating a plurality of objects in the stored image, analyzing respective motion of the plurality of objects and predicting a moment of acquisition at which the motion corresponds to an acquisition condition, and controlling the input light so as to perform imaging at the predicted moment of acquisition.

The imaging method may further include displaying the stored image, and receiving an input of a user selection signal to select the objects included in the displayed image. The designating may include designating the plurality of objects based on the user selection signal.

The designating the plurality of objects may automatically designate the object that corresponds to predetermined selection criteria among the objects that are included in the stored image.

Further, the motions of the objects may include at least one of moving traces and moving speeds of the respective objects. Further, the acquisition condition may be a condition set to perform the acquisition at a time point where collision occurs between the plurality of objects, and the predicting the moment of acquisition may calculate moving traces and moving speeds of the plurality of objects and may determine a time point where it is predicted that collision occurs between the plurality of objects as the moment of acquisition.

The imaging method may further include periodically sensing the image, wherein the predicting the moment of acquisition may determine existence/nonexistence of a new object by analyzing the stored images, and if the new object exists, may predict the moment of acquisition based on motion of the new object and the motion of the existing object.

The motion of the new object and the motion of the existing object may include at least one of motion traces and motion speeds.

The foregoing and/or other features and utilities of the present general inventive concept may also be achieved by providing a computer-readable medium to contain computer-readable codes as a program to execute a method to capture an instantaneous time point and to perform imaging as described above and hereinafter.

The foregoing and/or other features and utilities of the present general inventive concept may also be achieved by providing an imaging apparatus including an imaging unit including a lens to collect light as an image according to a shutter time, and a control unit configured to generate a signal to adjust the shutter time according to a prediction of an object in the image, and to control the imaging unit with the adjusted shutter time to capture another image to correspond to the prediction of the object.

The shutter time may be a regular shutter time and may be different from the adjusted shutter time, and the adjusted shutter time may be delayed or shortened from the regular shutter time.

The control unit may designate the object in the image, predict a motion of the object in a time axis, generate an acquisition time according to the predicted motion, and adjust the shutter time to capture the another image to correspond to the predicted motion.

The control unit may control the imaging unit with the shutter time for the image and with the adjusted shutter time for the another image.

The imaging unit may not capture the another image according to the shutter time to include a moment of the predicted motion of the object, and the imaging unit may capture the another image according to adjusted shutter time to include the moment of the predicted motion of the object.

BRIEF DESCRIPTION OF THE DRAWINGS

The above and other aspects, features and utilities of the present general inventive concept will be more apparent from the following detailed description when taken in conjunction with the accompanying drawings, in which.

DETAILED DESCRIPTION OF THE EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 1:
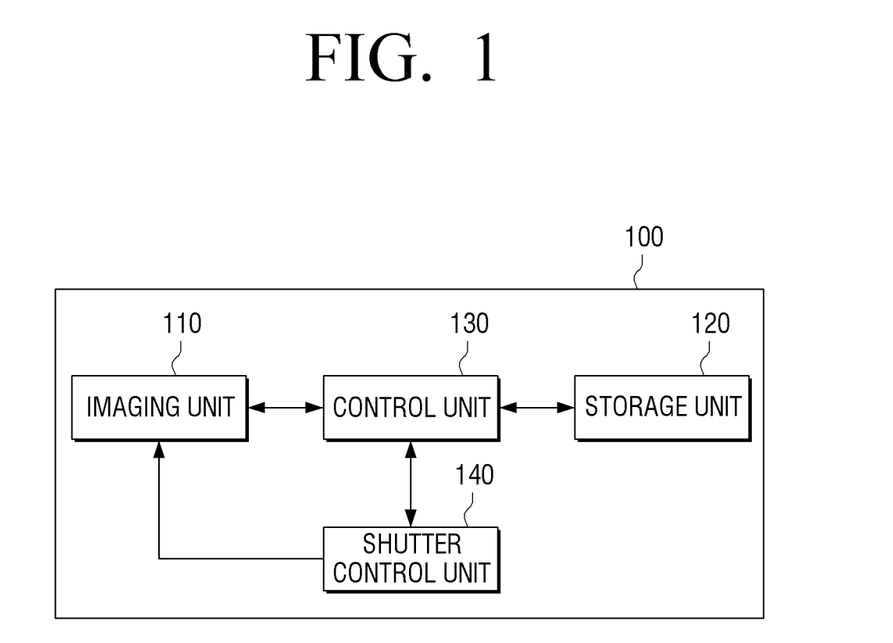
FIG. 1 is a block diagram illustrating an imaging apparatus according to an embodiment of the present disclosure.

FIG. 1 is a block diagram illustrating an imaging apparatus 100 according to an embodiment of the present disclosure. Referring to FIG. 1, the imaging apparatus 100 includes an imaging unit 110, a storage unit 120, a control unit 130, and a shutter control unit 140. The imaging unit 110 collects light input through a lens and senses an image. The imaging apparatus 100 may perform imaging, for example, photographing one or more objects as an image, storing the image, processing the image, and/or controlling one or more units thereof to control the image photographed.

The storage unit 120 stores a predetermined acquisition condition for instantaneous acquisition. Further, the storage unit 120 temporarily stores data generated by the control unit 130 or a sensed image. Further, the storage unit 120 may store programs or operation parameters that are used by the control unit 130. The storage unit 120 may be, for example, at least one type of storage media, such as a hard disk type, a multi-media card, a flash memory type, a micro type, a SD card, an XD card, and the like. The storage unit 120 may be detachably attached to a terminal of the control unit 130 as an external storage unit of the imaging apparatus 100. Further, although the storage unit 120 is illustrated separately from the control unit 130, the storage unit 120 may be a RAM or a ROM provided in the control unit 130 when it is not necessary to configure the storage unit 120 separately from the control unit 130.

The control unit 130 performs various controls and processes according to the programs stored in the storage unit 120 of the imaging apparatus 100. Further, the control unit 130 designates a plurality of objects in the image stored in the storage unit 120, analyzes respective motions of the plurality of objects, and predicts a moment of acquisition at which the motion corresponds to the acquisition condition. The shutter control unit 140 controls the imaging unit 110 to perform imaging at the predicted moment of acquisition through generation of control parameters. It is possible that the shutter control unit 140 may be included in the control unit 130. The above units may be disposed or installed in a single integrated body or housing of the imaging apparatus 100.

Figure 2:
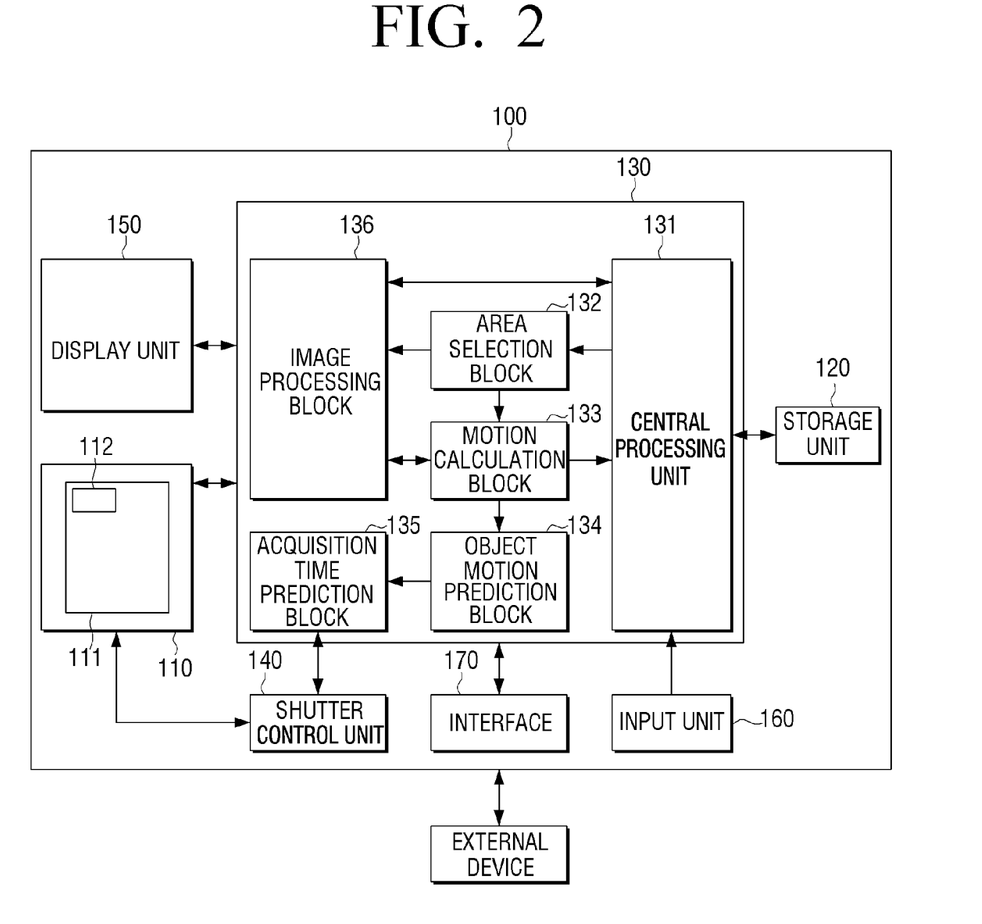
FIG. 2 is a detailed block diagram illustrating an imaging apparatus according to an embodiment of the present disclosure.

FIG. 2 is a detailed block diagram illustrating an imaging apparatus 100 according to an embodiment of the present disclosure. The imaging apparatus 100 of FIG. 2 is similar to the imaging apparatus 100 of FIG. 1. The imaging apparatus 100 may further includes a display unit 150 and an input unit 160. The imaging unit 110 includes an image sensor 111. The image sensor 111 may be, for example, a CCD (Charge Coupled Device) or a CMOS (Complementary Metal Oxide Semiconductor), and generates an electrical analog signal depending on the quantity (or characteristics) of incident light. The generated analog signal is supplied to an image processing block 136, and the image processing block 136 processes the signal and generates an image.

The control unit 130 includes a central processing unit 131, an area selection block 132, a motion calculation block 133, an object motion prediction block 134, an acquisition time prediction block 135, and an image processing block 136.

The central processing unit 131 may include a ROM or a RAM, and controls respective units of the imaging apparatus 100. For example, if the central processing unit 131 transmits a control signal to a driving unit to drive the imaging unit 110 based on a control signal supplied from the central processing unit 131. Further, the central processing unit 131 transmits a control signal to the image processing block 136 such that a predetermined process is executed in the image processing block 136. Further the central processing unit 131 receives an input signal of data from a user or selectively receives an input signal of a predetermined scenario, and notifies the area selection block 132 of the received signal so that the area selection block 132 can select and control a concerned area 112 of the image sensor 111 according to the input data or scenario.

The area selection block 132 is a portion configured to calculate position information of the concerned area 112 in which one or more motion vectors in an image are to be obtained. A position and a size of the concerned area 112 on the image sensor 111 are controlled by the area selection block 132. The area selection block 132 stores an image of the concerned area 112 in the storage unit 120 based on the selection signal input according to the user or the designated scenario. The images being stored are image information having different sizes and frame rates.

The motion calculation block 133 may extract motion information in the image. Respective image data input from the image processing block 136 to the motion calculation block 133 are image data captured differently from a temporal viewpoint. The image data may be different from each other with respect to a time axis or a frame unit. The object motion prediction block 134 may calculate and predict which direction and how long the corresponding block of a next frame will move from a current frame using resultant values obtained from a previous motion vector block. The acquisition time prediction block 135 calculates a shutter phase using predicted values obtained by the object motion prediction block 134 and current shutter information of the shutter control unit 140. Further, the acquisition time prediction block 135 continuously transfers the result of calculation to the imaging unit 110 to perform imaging.

The image processing block 136 processes an image signal input from the imaging unit 110 and the area selection module 132, and transmits image data to the motion calculation block 133 to extract the motion information of the object. The analog signal input from the imaging unit 110 is converted into a digital signal after passing through a noise removing process or the like. The converted digital signal is stored in the storage unit 120 or displayed on the display unit 150. The image that is displayed on the display unit 150 may be a through-image that has passed through a lens or an image stored in the storage unit 120.

Each block of the control unit 130 may be implemented through hardware modularization or software blocking, for example, a memory processor.

The display unit 150 may display thereon an image stored in the storage unit 120 of the imaging apparatus 100, an image stored in an external storage device, and an image input from an external device through an external input interface, for example, an interface unit 170. Further, the display unit 150 may display a menu screen and a histogram that indicates distribution of luminance levels of the image. Further, the display unit 150 may display not only an image but also a moving image or live view. The display unit 150 is controlled by the control unit 130. It is possible that the display unit 150 may be implemented in various forms, such as an LCD, an OLED, a flexible display, or a three-dimensional (3D) display. Further, the display unit 150 may be a touch screen or panel unit that can be used as an input device in addition to an output device.

The input unit 160 receives an input of selection of an object for instantaneous acquisition from a user. The input unit 160 may be implemented in various forms, such as an I/O (Input/Output) interface that receives various input signals from external input means, such as a touch panel implemented on the display unit 150, various kinds of buttons, and voice input device that can recognize user's voice. In the case where the input unit 160 includes a touch panel, the user can execute various functions of the imaging apparatus 100 by pressing a predetermined position of the display unit 150. In this case, the display unit 150 includes a detection unit detecting the position which the user makes contact with. The position information detected by the detection unit is supplied to the central processing unit 131 of the control unit 130. It is possible that the area selection block 132, the motion calculation block 133, the object motion prediction block 134, and the acquisition time prediction block 135 may be referred to as a unit to generate a signal to correspond to an acquisition time and/or a signal to modify or adjust a shutter time of the imaging unit 110.

Figure 3:
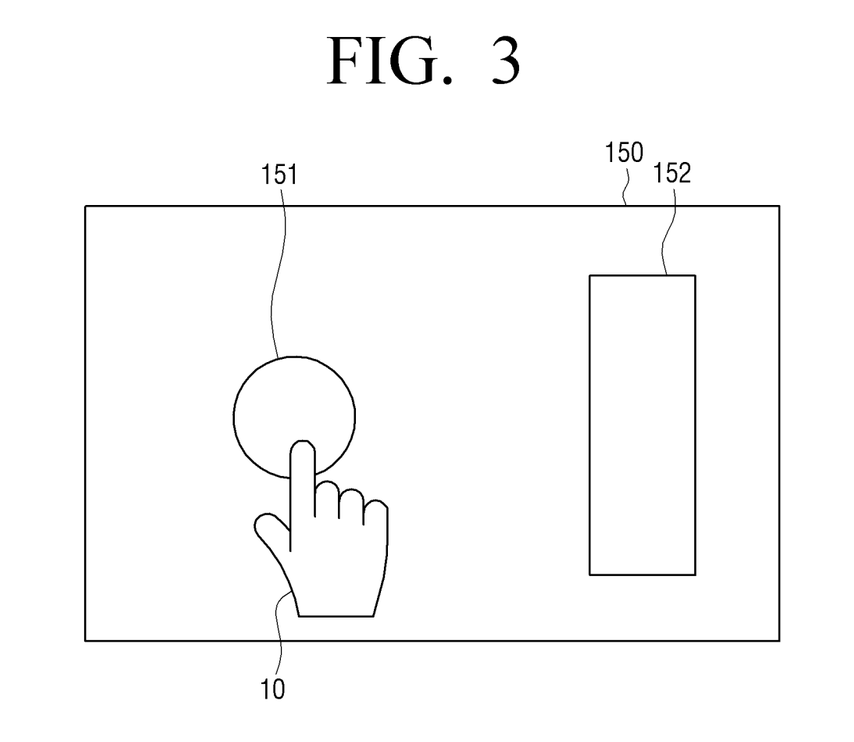
FIG. 3 is a diagram illustrating an operation of selecting an object according to an embodiment of the present disclosure.

FIG. 3 is a diagram illustrating an operation of selecting an object according to an embodiment of the present disclosure. The operation of selecting an object can be initiated or activated by selecting a menu through the display unit 150 and/or input unit 160. A user 10 can select multiple objects 151 and 152 which the user desires to image on the display unit 150 that includes the touch panel unit. The signal selected by the user 10 is transferred to the area selection block 132 through the central processing unit 131 so that the area selection block 132 can select and control the concerned area 112 of the image sensor 111.

Figure 4:
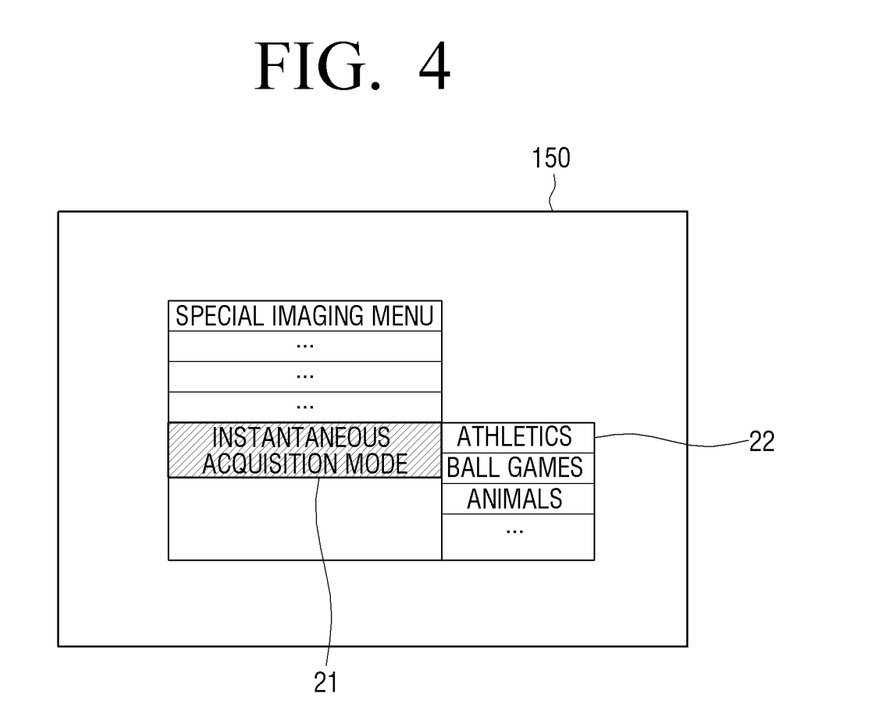
FIG. 4 is a diagram illustrating an operation of automatically designating an object according to an embodiment of the present disclosure.

FIG. 4 is a diagram illustrating an operation of automatically designating an object according to an embodiment of the present disclosure. The object to be imaged may be automatically designated according to a pre-stored condition. If the user selects a menu, the display unit 150 displays a menu window. The displayed menu window can display special imaging items and has an instantaneous acquisition mode 21 as a lower rank item. If the user selects the instantaneous acquisition mode 21, items, such as athletics, ball games, animals, and the like, may be displayed as detailed items 22. If the user selects one item, the imaging apparatus 100 loads a scenario of a method of detecting a pre-stored motion thereof. The menu configuration illustrated in FIG. 4 is merely exemplary, and the menu can be displayed in various methods.

Further, in an embodiment in which the imaging apparatus 100 automatically designates one or more objects, the imaging apparatus 100 may designate pre-selected objects as objects to be imaged when the object coincides with pre-registered image scene information. In addition, if the user selects only the instantaneous acquisition mode 21, the imaging apparatus 100 may detect objects that move in a speed, for example, in a fastest speed, in image content and automatically designate the detected objects as the objects to be imaged. Further, the imaging apparatus 100 may pre-register motion characteristics of motions, and if a motion having the same pattern occurs, the imaging apparatus 100 may detect the corresponding object as the object to be imaged. In an embodiment, the area selection of the area selection block 132 may be selected using the speed of the motion, or may be selected using path information of the motion. At this time, a plurality of areas may be selected or a user selection mode and an automatic mode may be simultaneously adopted and selected. Further, if the shape information of the currently selected area is changed, it is also possible to reflect such change.

Figure 5:
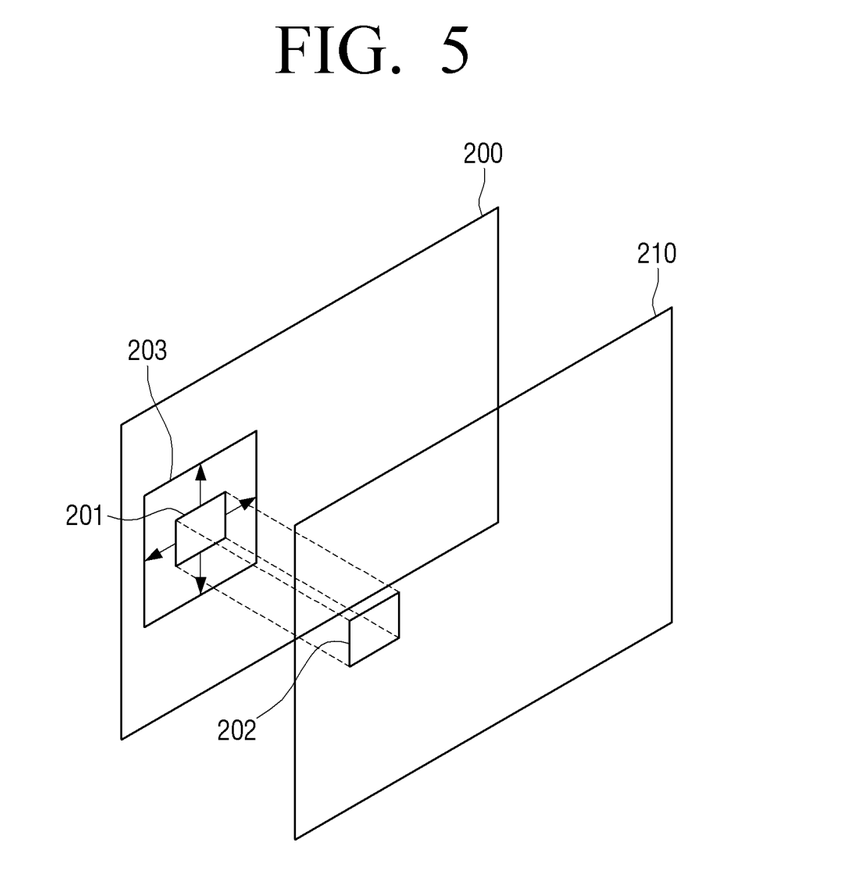
FIG. 5 is a diagram illustrating a method of detecting a motion of an object according to an embodiment of the present disclosure.

FIG. 5 is a diagram illustrating a method of detecting motion of an object according to an embodiment of the present disclosure. The motion calculation block 133 calculates motion vectors in areas selected by the area selection block 132 with respect to a previous frame 200. The user and the area selection block 132 may select an area 202 in a current frame 210. The motion calculation block 133 calculates a motion by projecting the selected area 202 onto the previous frame 200 and by grasping (or determining) a path 203 that indicates how and how long the projected area 201 moves within the previous frame 200.

The motion can be calculated in various methods. Area-based motion vectors and a feature point-based matching method may be used. The corresponding result may be obtained from the number of pixels that move in the image with respect to the same area of the previous frame 200, and may be obtained by a moving distance per time, that is, speed value.

Figure 6:
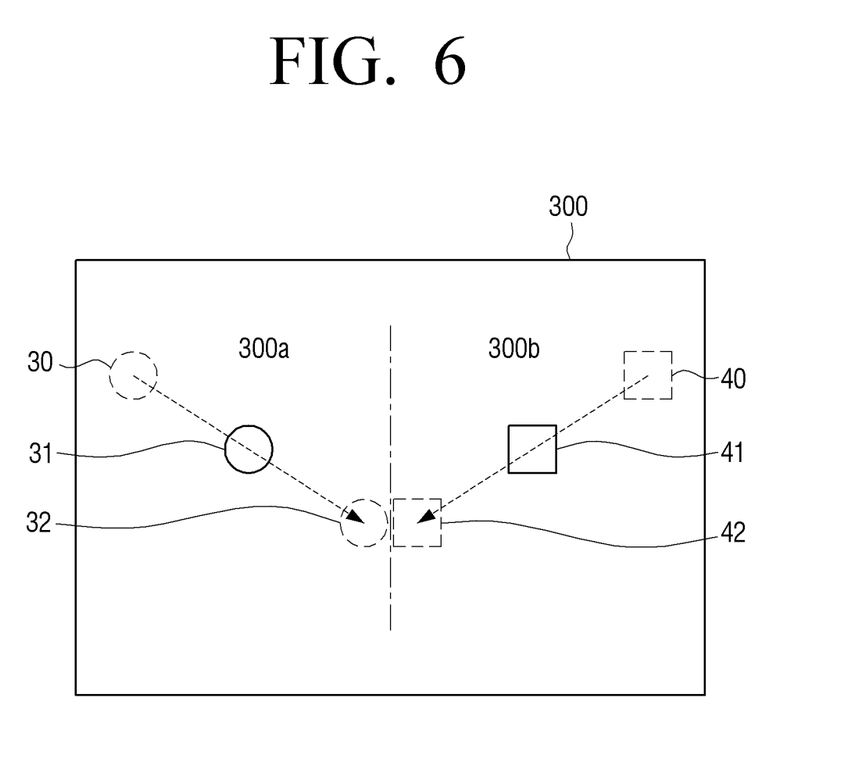
FIG. 6 is a diagram illustrating a method of predicting a moment of acquisition according to an embodiment of the present disclosure.

FIG. 6 is a diagram illustrating a method of predicting a moment of acquisition according to an embodiment of the present disclosure. A first object 300a and a second object 300b exist at positions 31 and 32 in a current frame 300. The object motion prediction block 134 calculates a speed and/or an acceleration of the first and second objects 300a and 300b using positions 30 and 40 of previous frames and the positions 31 and 41 of the current frame. Then, the object motion prediction block 134 predicts positions 32 and 42 of the two objects 300a and 300b in a future frame from the above-described resultant values.

When a position value of the previous position 30 of the first object 300a in an X direction is OBx11 and a position value of the previous position 40 of the second object 300b in an X direction is OBx21, distances in the X direction of the two objects may be obtained by Dx1=|OBx11−OBx21|. In the same manner, it may be predicted as follows.

Dx2=|OBx12−OBx22| (distance between two current positions of two objects in a current frame)

Dx3=|OBx13−OBx23| (distance between two next positions of two objects in a next frame)

At this time, since the OBx13 and OBx23 are future values that have not yet been generated, it is required to perform prediction. All motions have acceleration relations, and based on these, values of OBx13 and OBx23 are obtained. If plural objects overlap each other or become in contact with each other at any moment, the distance between the two objects converges to 0. Accordingly, the motion relations between two objects can be closely examined by analyzing motion patterns of Dx1 to Dxn.

The acquisition time prediction module 135 calculates a time with respect to the above-described values Dx1 to Dxn, predicts the acquisition time through reception of current shutter information from the shutter control unit 140, and informs the shutter control unit 140 of shutter phase information based on the prediction value. The acquisition time may be predicted using any one or both of motion traces and motion speeds of the objects according to circumstances.

Figure 7:
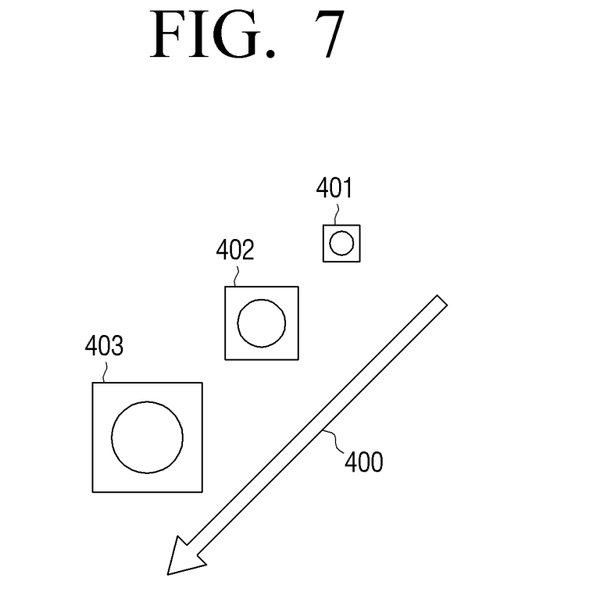
FIG. 7 is a diagram illustrating conversion of shape information according to an embodiment of the present disclosure.

FIG. 7 is a diagram illustrating conversion of shape information according to an embodiment of the present disclosure. An object moves with the lapse of time 400. If a 3D motion is projected onto 2D, the size of the area is changed. Accordingly, in order for the motion calculation block 133 to extract accurate values when calculating motion vectors, it is necessary to update the area information 401, 402, and 403 with the lapse of time in real time. The motion calculation block 133 predicts the motion using the transferred area information, and the object motion prediction block 134 calculates the acceleration according to the motion with respect to the respective areas. Further, the acquisition time prediction block 135 transfers a control value that corresponds at which time point the shutter information is to be changed to the shutter control unit 140 using distance information of respective input areas.

The control unit 130 may include a readout controller for variously obtaining desired input positions and sizes of input images. The readout controller operates to receive the corresponding data from the image sensor 111 with reference to the position and size of the concerned area that is changed by the motion calculation block 133. If a desired event is terminated or it is not necessary to further proceed with the event using the control information received from the shutter control unit 140, the procedure is terminated. Otherwise, the procedure is shifted to the motion calculation module 133 and is continuously repeated until the termination of the event.

Figure 8:
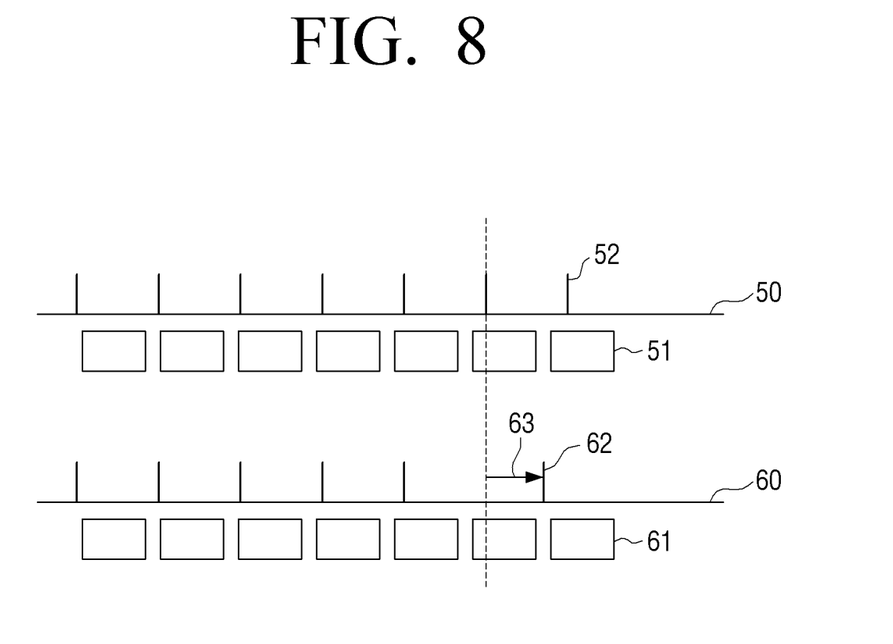
FIG. 8 is a diagram illustrating an imaging method of adjusting a shutter phase according to an embodiment of the present disclosure.

FIG. 8 is a diagram illustrating an imaging method through adjustment of a shutter phase according to an embodiment of the present disclosure. A shutter period 50 before the shutter information is changed and a shutter period 60 in which the shutter phase according to an embodiment of the present disclosure is changed are compared with each other. First, in the case where the shutter has a normal shutter period 50, an image 51 at a moment desired by the user and the shutter operation time point 52 at that moment do not coincide with each other, and thus the image 51 at the desired moment cannot be captured. For example, the above-described case occurs when it is intended to acquire one scene of an athletic game or an object moving at high speed.

Next, a shutter period 60 of which the shutter phase has been changed according to an embodiment of the present disclosure will be described. In the case of selecting and imaging two objects, respective blocks of the control unit 130 calculate motions of the two objects, predict future motions, and determine prediction values of acquisition time. This process is performed before an image 61 at a moment desired by a user is captured. In the case of determining a shutter phase delay 63 based on time when the two objects meet each other and current shutter information, the shutter control unit 140 commands the shutter phase delay. Accordingly, the user can obtain the image 61 at the moment desired by the user by the shutter that operates at a delayed shutter operation time point 62. If the control unit 130 determines that the shutter phase delay is not necessary, the imaging apparatus 100 may perform imaging based on the current shutter information.

Figure 9:
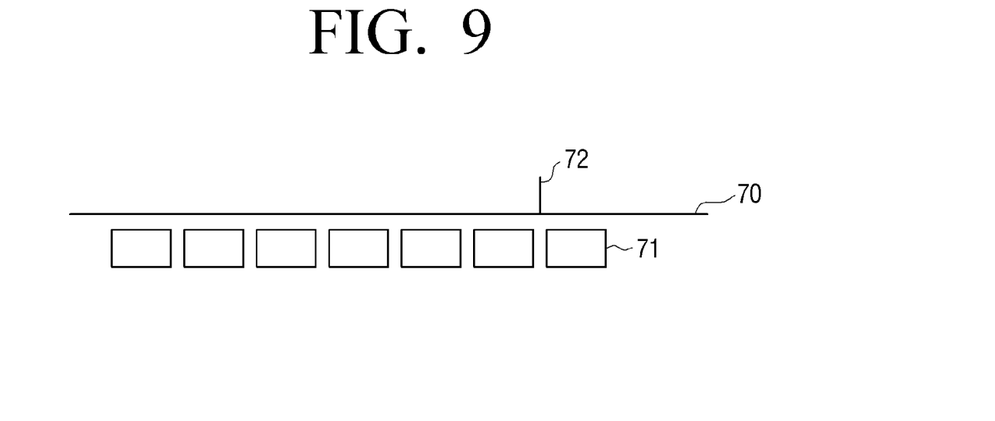
FIG. 9 is a diagram illustrating an imaging method at a predicted moment of acquisition according to another embodiment of the present disclosure.

FIG. 9 is a diagram explaining an imaging method at a predicted moment of acquisition according to another embodiment of the present disclosure. In the above-described embodiment, continuous imaging (shooting or photographing) is exemplified, but it is also possible to apply the present disclosure to a case where the continuous imaging is not performed. If the user selects an instantaneous acquisition mode, as described above, the respective blocks of the control unit 130 predict the moment of acquisition from the motions of the two objects, and the shutter control unit 140 operates the shutter according to the prediction values. Accordingly, the user can obtain an image 71 at the moment desired by the user, that is, according to a shutter operation time point 72 in a shutter period 70.

The method of operating the shutter of the imaging apparatus 100 at the moment desired by the user may be implemented in various manners. First, the imaging apparatus 100 enters into the instantaneous acquisition mode, and if two objects are selected, the imaging apparatus 100 automatically recognize and image the selected objects. Second, the imaging apparatus 100 enters into the instantaneous acquisition mode, and if the user presses the shutter once after two objects are selected, the imaging apparatus 100 performs the capturing at the moment of acquisition. Third, the imaging apparatus 100 enters into the instantaneous acquisition mode, and if the moment of acquisition arrives while the user is pressing the shutter after two objects are selected, the imaging apparatus 100 performs the imaging.

According to an embodiment, in order to accurately capture the moment where the moving objects meet each other during capturing a still image, the motions of the objects in the image are analyzed, and the shutter information is changed. Although high-end class cameras which are recently released and support high-speed continuous shooting can detect high-speed motion by imaging about 10 sheets per second, they have limitations in motions that proceed at higher speed, such as sporting scenes. According to the present disclosure, the current shutter information is changed through analysis of dynamic motions and an accurate shutter time point can be finally determined.

Figure 10:
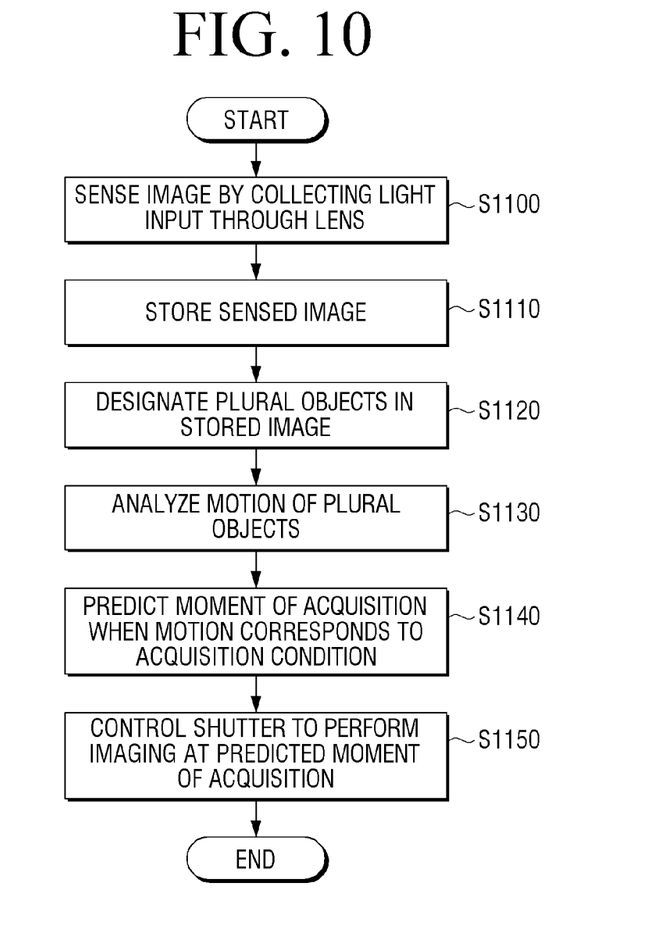
FIG. 10 is a flowchart illustrating an imaging method of an imaging apparatus according to an embodiment of the present disclosure.

FIG. 10 is a flowchart illustrating an imaging method according to an embodiment of the present disclosure. First, the imaging unit senses an image by collecting light input through a lens at operation S1100. The storage unit stores the sensed image at operation S1110. The sensed image is used to predict the moment of acquisition, and only two frames, that is, the previous frame image and the current frame image, are temporarily stored. One or more objects can be designated in the image through a displaying screen or a preset operation at operation S1120. The control unit analyzes respective motions of a plurality of objects at operation S1130, and predicts the moment of acquisition where the motion corresponds to the acquisition condition at operation S1140. The shutter control unit controls the shutter to perform the imaging at the predicted moment of acquisition at operation S1150.

FIGS. 11 to 14 are exemplary diagrams illustrating captured images according to various embodiment of the present disclosure.

Figure 11:
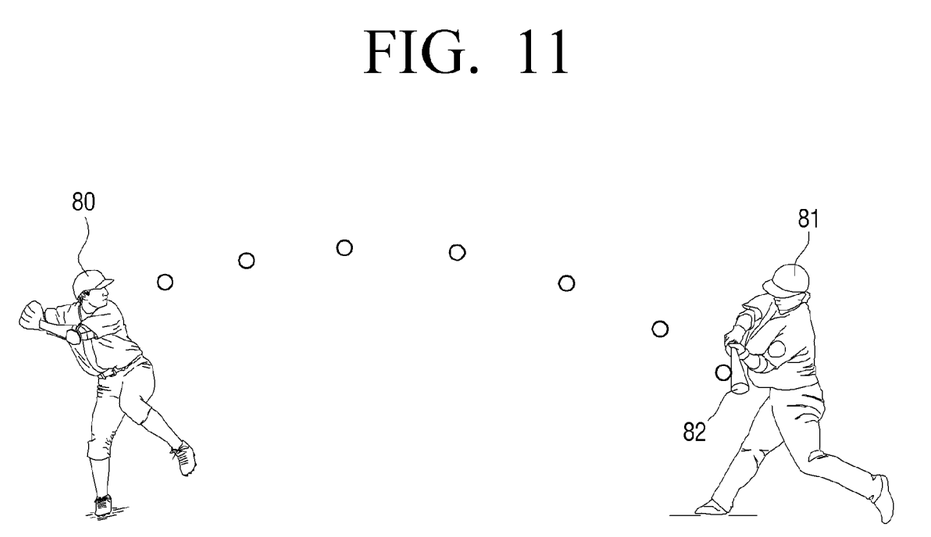
FIGS. 11 to 14 are exemplary diagrams illustrating captured images according to various embodiment of the present disclosure.

FIG. 11 is a diagram illustrating a captured image of a baseball game scene as an example. The image sensor 111 senses a baseball and a baseball bat. The baseball and the baseball bat are designated as target objects to be acquired by the user or automatic setting. If a pitcher 80 throws a ball, the ball is directed to a batter 81 as drawing a specified trace at a specified speed, and if the batter 81 swings a baseball bat 82, the control unit 130 predicts the acquisition time based on the motion of the ball and the baseball bat 82. At the predicted acquisition time, the shutter control unit 140 delays the shutter phase or operates the shutter, and thus the imaging unit 110 can capture the image at the moment where the batter 81 hits the ball.

Figure 12:
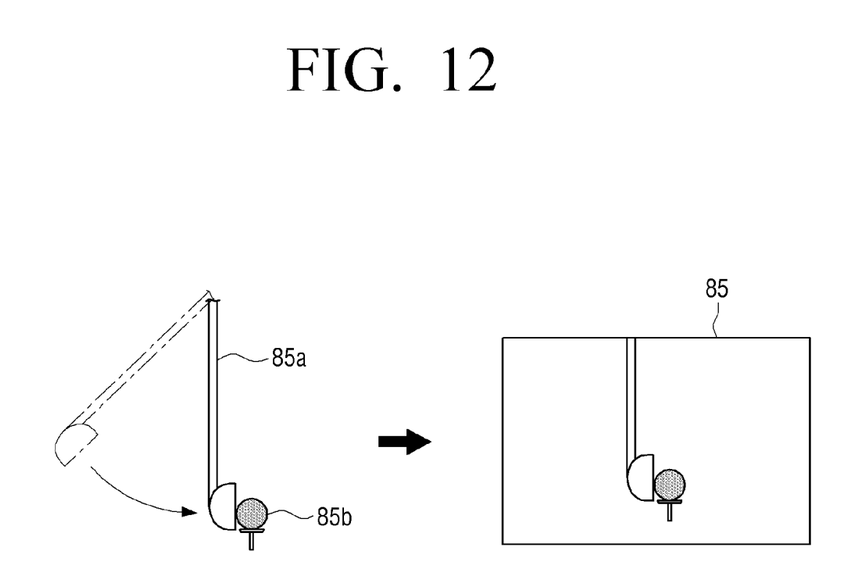

FIG. 12 is a diagram illustrating a captured image 85 of a scene in which a golf ball 85b is hit by a golf club 85a as an example. The image sensor 111 senses the golf club 85a and the golf ball 85b, and the golf club 85a and the golf ball 85b are designated as target objects through the area selection block 132. If the golf club 85a swings, the control unit 130 predicts the acquisition time based on the motion of the golf club 85a. Although the golf ball 85b is stopped (stationary or staggering), the detailed method of predicting the acquisition time using the relative position and speed through the control unit 130 is the same as the process illustrated in FIG. 11. At the predicted acquisition time, the shutter control unit 140 delays the shutter phase or operates the shutter, and thus the imaging unit 110 can capture an image 85 at the moment where the golf club 85a hits the golf ball 85b.

Figure 13:
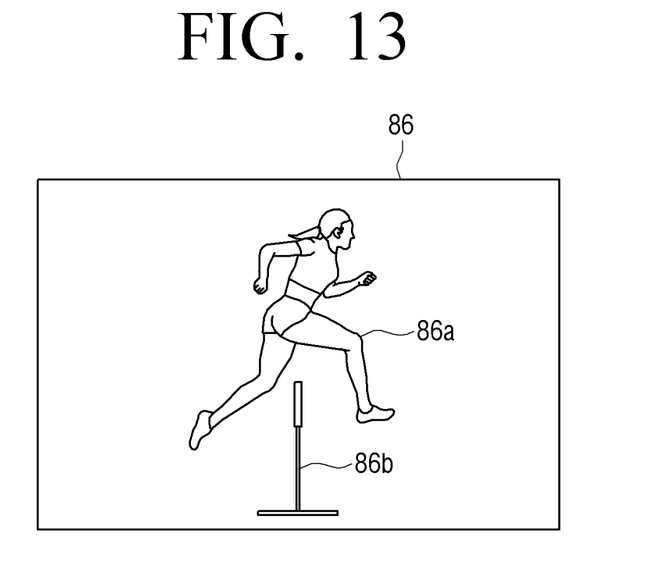

FIG. 13 is a diagram illustrating a captured image 86 of a scene in which a hurdler 86a jumps over a hurdle 86b as an example. In a case of hurdling, two objects do not collide or overlap each other. However, even if the two objects do not collide or overlap each other, the moment where specified points or specified areas of the objects are in predetermined positions may be set as the moment of acquisition by a user or may be set in advance in a set area of the imaging apparatus. For example, in FIG. 13, the moment where an upper end portion of the hurdle 86b and an end of pants (or human body portion) of the hurdler 86a are put in a straight line may be set as the moment of acquisition, and an image 86 at the moment where the hurdler 86a jumps over the hurdle 86b may be captured using the prediction value at the moment.

Figure 14:
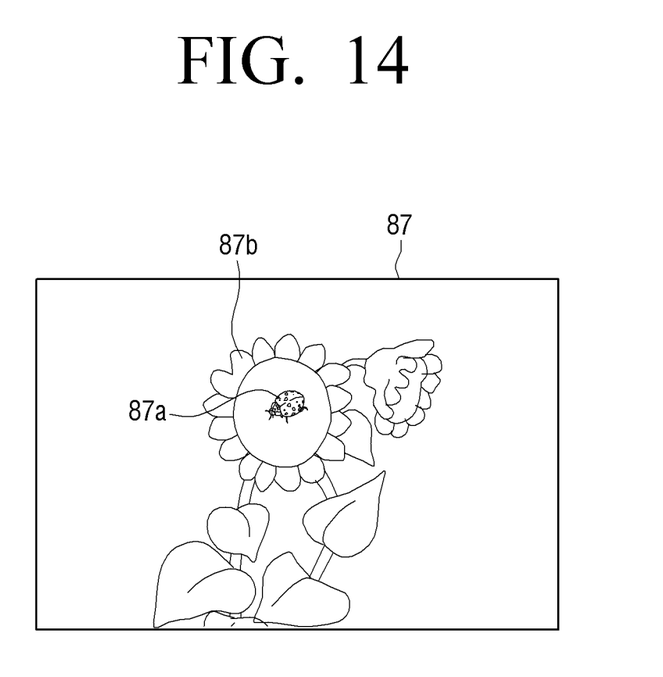

FIG. 14 is a diagram illustrating a captured image 97 of a scene in which an insect 87a sits down on a flower 87b. A motion of the insect 87a may not be a typical predictable motion. However, since the motion of the insect 87a at the moment just before the insect 87a sits down on the flower 87b is much the same as the typical motion, and the prediction of the above-described acquisition time is performed in such an area, it is possible to predict the acquisition time even with respect to the object that has a non-regular motion.

Figure 15:
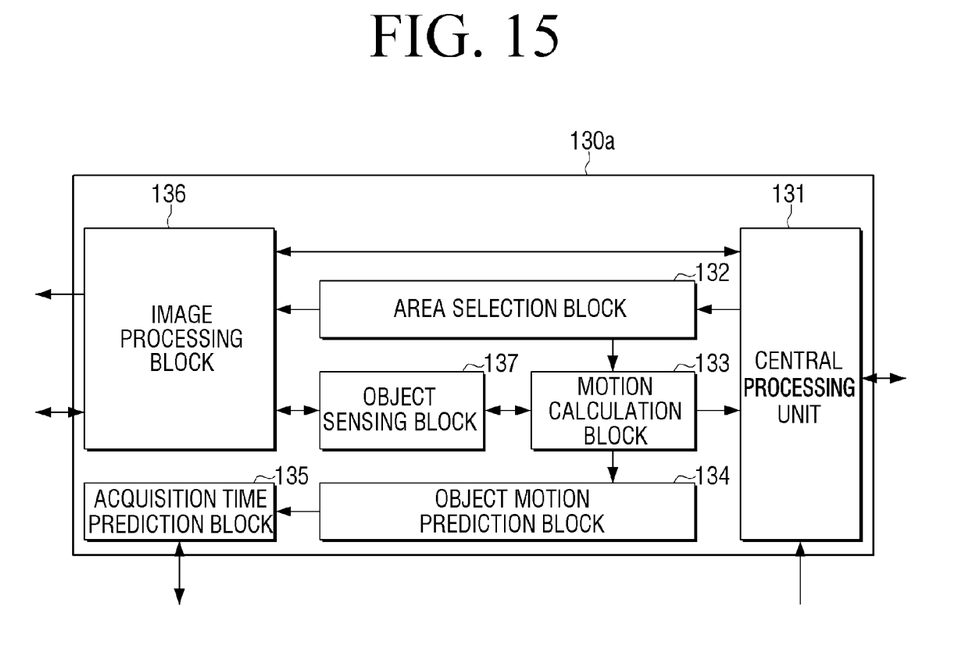
FIG. 15 is a block diagram illustrating a control unit of an imaging apparatus according to an embodiment of the present disclosure.

FIG. 15 is a block diagram illustrating a control unit 130a usable with an imaging apparatus according to another embodiment of the present disclosure. In the above-described embodiments, it is exemplified that plural objects exist in one screen. However, imaging is also possible through predicting an acquisition time even in the case where only one object exists in one screen. The control unit 130a can be used as the control unit 130 of the imaging apparatus 100 of FIG. 1. The control unit 130a of the imaging apparatus 100 according to this embodiment further includes an object sensing block 137.

The object sensing block 137 is a block that informs the existence and position of a new target object in the screen. As an example, the new target object may be a predetermined specified object. For example, the new target object may be existence/nonexistence of a baseball or a baseball bat, existence/nonexistence of a specified character or singularity, or the like. If the user loads a necessary scenario, the object sensing block 137 searches whether all objects that are required for the scenario exist in the screen. If all objects exist, the control unit 130a operates according to the above-described embodiments. If all the required objects do not exist in the screen, the object sensing block 137 continuously searches whether all the required objects exist in the screen.

Other blocks in FIG. 15 are as described above with reference to FIG. 2. Respective blocks of the control unit 130a may be implemented through hardware modularization or software blocking, for example, a memory processor.

Figure 16:
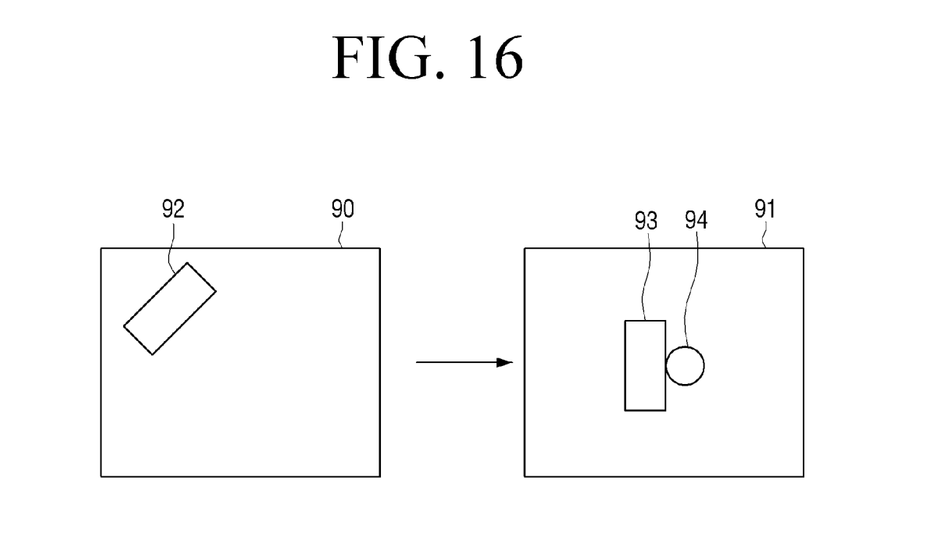
FIG. 16 is a diagram illustrating a method of predicting a moment of acquisition according to an embodiment of the present disclosure.

FIG. 16 is a diagram illustrating a method of predicting a moment of acquisition according to an embodiment of the present disclosure. On an initial screen 90 only one object 92 exists. The object sensing block 137 continuously searches whether all required objects exist in the screen, and if a new target object exists, the control unit 130 predicts the acquisition time with respect to plural objects 93 and 94 and performs imaging.

The new target object may be designated by the user or the control unit 130 may automatically designate a moving object that newly appears in the screen as the target object without user's designation. For example, in the case where only a soccer ball is present in a free kick scene of a soccer game, the object sensing block 137 recognizes a kicker that newly appears in the screen as a new target object and predicts the acquisition time to perform imaging.

Figure 17:
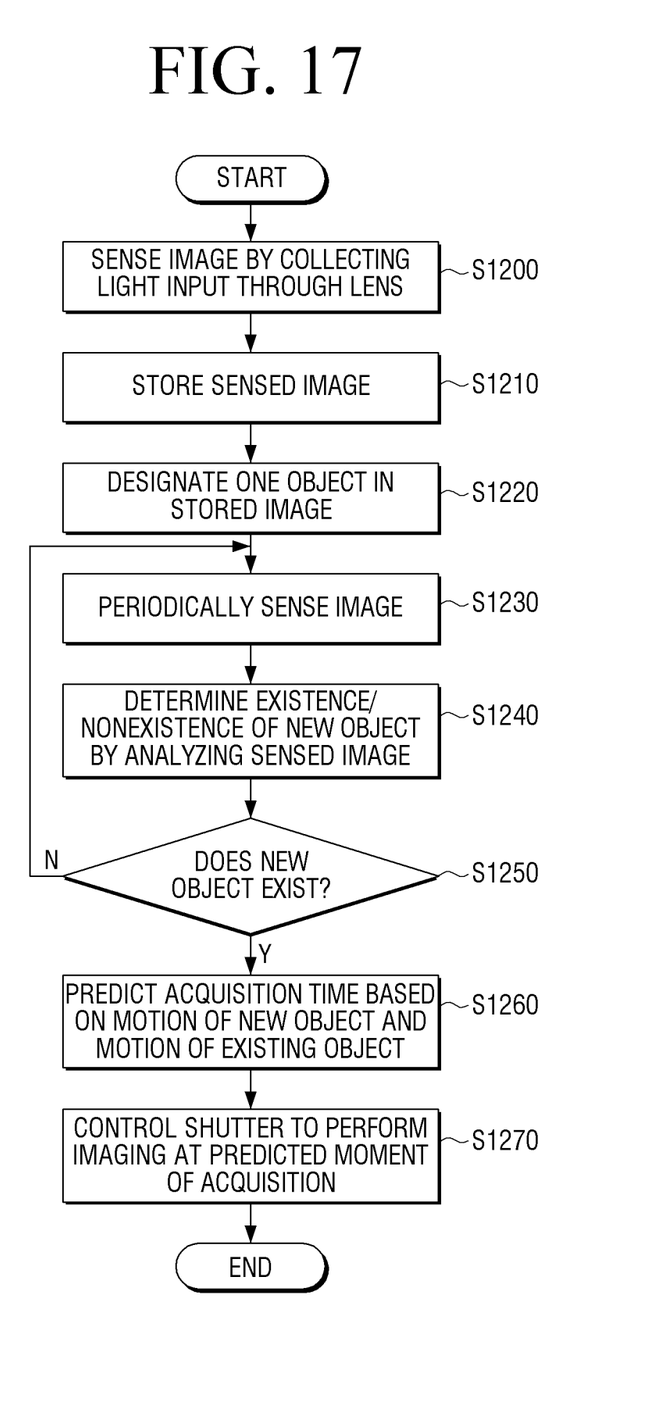
FIG. 17 is a flowchart illustrating an imaging method according to an embodiment of the present disclosure.

FIG. 17 is a flowchart illustrating an imaging method according to an embodiment of the present disclosure. According to the imaging method according to the embodiment of the present disclosure, the imaging unit first performs image sensing by collecting light input through a lens at operation S1200. The storage unit stores the sensed image at operation S1210. If one object is designated in the stored image at operation S1220, the control unit determines whether a new object exists at operation S1240 by periodically sensing the image at operation S1230. If a new object exists, the acquisition time is predicted based on the motion of the new object and the motion of the existing object at operation S1260. The shutter control unit controls the shutter to perform the imaging at the predicted moment of acquisition at operation S1270.

According to the embodiments of the present disclosure, an imaging apparatus may adjust a shutter operation time to an instantaneous time point to perform imaging according to a motion prediction of an object.

The above-described imaging apparatus may be any one of all terminal devices, such as a still type camera, a moving image camera, a mobile phone having a camcorder or image capturing function, a tablet, and a personal data assistant (PDA).

The methods according to the above-described various embodiments may be created by software block, for example, memory processor, and mounted on the display device or the system.

According to an embodiment of the present disclosure, a non-transitory computer readable medium may be installed which stores a program that performs collecting light input through a lens and sensing an image, storing the sensed image, designating a plurality of objects in the stored image, analyzing respective motion of the plurality of objects and predicting a moment of acquisition at which the motion corresponds to an acquisition condition, and controlling the input light so as to perform imaging at the predicted moment of acquisition.

The non-transitory computer readable medium means a medium which semi-permanently stores data and can be read by a device rather than a medium that stores data for a short time period, such as a register, a cache, a memory, or the like. Specifically, the above-described application or programs may be stored in and provided from a non-transitory computer readable medium, such as a CD, a DVD, a hard disk, a Blu-ray disk, a USB, a memory card, a ROM, or the like.

While the present general inventive concept has been shown and described with reference to certain embodiments thereof, it will be understood by those skilled in the art that various changes in form and detail may be made therein without departing from the spirit and scope of the present general inventive concept, as defined by the appended claims.

What is claimed is:

1. An imaging apparatus comprising:
    an imaging unit to collect light input through a lens and sensing an image continuously;
    a storage unit to store an acquisition condition and the continuously sensed images;
    a control unit to designate a plurality of objects in one of the continuously stored images, to analyze respective motion of the plurality of objects in the continuously stored images, and to predict a moment of acquisition at which the motion corresponds to the acquisition condition; and
    a shutter control unit to control the imaging unit to perform imaging at the predicted moment of acquisition,
    wherein the acquisition condition is a condition set to perform the acquisition at a time point where collision occurs between the plurality of objects, and
    wherein the control unit calculates moving traces and moving speeds of the plurality of objects and determines the time point where it is predicted that the collision occurs between the plurality of objects as the moment of acquisition.

2. The imaging apparatus as claimed in claim 1, further comprising:
    a display unit to display one of the images stored in the storage unit; and
    an input unit to receive an input of a user selection signal to select the objects included in the displayed image,
    wherein the control unit designates the plurality of objects based on the user selection signal.

3. The imaging apparatus as claimed in claim 1, wherein the control unit automatically designates the object that corresponds to predetermined selection criteria among the objects that are included in one of the images stored in the storage unit.

4. The imaging apparatus as claimed in claim 1, wherein the control unit predicts the moment of acquisition by calculating at least one of moving traces and moving speeds of the respective objects.

5. The imaging apparatus as claimed in claim 1, wherein:
    the imaging unit periodically senses the image;
    the storage unit stores the periodically sensed images; and
    the control unit determines existence/nonexistence of a new object by analyzing the images stored in the storage unit, and if the new object exists, predicts the moment of acquisition based on motion of the new object and the motion of the existing object.

6. The imaging apparatus as claimed in claim 5, wherein the control unit predicts the moment of acquisition by calculating at least one of motion traces and motion speeds of the existing object and the new object.

7. An imaging method of an imaging apparatus, the method comprising:
    collecting light input through a lens and sensing an image continuously;
    storing the continuously sensed images;
    designating a plurality of objects in one of the continuously stored images;

analyzing respective motion of the plurality of objects in the continuously stored images and predicting a moment of acquisition at which the motion corresponds to an acquisition condition; and controlling the input light so as to perform imaging at the predicted moment of acquisition, wherein the acquisition condition is a condition set to perform the acquisition at a time point where collision occurs between the plurality of objects, and wherein the predicting the moment of acquisition includes calculating moving traces and moving speeds of the plurality of objects and determining the time point where it is predicted that the collision occurs between the plurality of objects as the moment of acquisition.

8. The imaging method as claimed in claim 7, further comprising:

displaying one of the stored images; and receiving an input of a user selection signal for selecting the objects included in the displayed image, wherein the designating designates the plurality of objects based on the user selection signal.

9. The imaging method as claimed in claim 7, wherein the designating the plurality of objects automatically designates the object that corresponds to predetermined selection criteria among the objects that are included in the stored images.

10. The imaging method as claimed in claim 7, wherein the motions of the objects include at least one of moving traces and moving speeds of the respective objects.

11. The imaging method as claimed in claim 7, further comprising:

periodically sensing the image, wherein the predicting the moment of acquisition determines existence/nonexistence of a new object by analyzing the periodically stored images, and if the new object exists, predicts the moment of acquisition based on motion of the new object and the motion of the existing object.

12. The imaging method as claimed in claim 11, wherein the motion of the new object and the motion of the existing object include at least one of motion traces and motion speeds.

13. A non-transitory computer-readable medium containing computer-readable codes as a program to execute the method of claim 7.

14. An imaging apparatus comprising:

an imaging unit including a lens to collect light as an image continuously; and a control unit configured to generate a signal to adjust a shutter time according to a prediction of an object in one of the images by analyzing motion of the object in the images based on an acquisition condition, and to control the imaging unit with the adjusted shutter time to capture another image to correspond to the prediction of the object, wherein the acquisition condition is a condition set to perform the acquisition at a time point where collision occurs between the plurality of objects, and wherein the control unit calculates moving traces and moving speeds of the plurality of objects and determines the time point where it is predicted that the collision occurs between the plurality of objects as the prediction of the object.

15. The imaging apparatus of claim 14, wherein:

the shutter time is a regular shutter time and is different from the adjusted shutter time; and the adjusted shutter time is delayed or shortened from the regular shutter time.

16. The imaging apparatus of claim 14, wherein the control unit designates the object in the one image among the plurality of images, predicts a motion of the object in a time axis, generates an acquisition time according to the predicted motion, and adjusts the shutter time to capture the different image to correspond to the predicted motion.

17. The imaging apparatus of claim 14, wherein the control unit controls the imaging unit with the shutter time for the one image and with the adjusted shutter time for the different image.

18. The imaging apparatus of claim 14, wherein the imaging unit captures the different image according to adjusted shutter time to include a moment of the prediction of the object.

* * * * *